United States Patent [19]

Abolins

[11] 4,242,254

[45] Dec. 30, 1980

[54] GLASS REINFORCEMENTS AND FIRE RETARDANT GLASS-RESIN COMPOSITES THEREFROM

[75] Inventor: Visvaldis Abolins, Delmar, N.Y.

[73] Assignee: General Electric Company, Pittsfield, Mass.

[21] Appl. No.: 727,349

[22] Filed: Sep. 28, 1976

Related U.S. Application Data

[63] Continuation of Ser. No. 100,441, Dec. 21, 1970, abandoned.

[51] Int. Cl.$^3$ .......... C08K 7/10; C08K 9/04; C08K 9/06

[52] U.S. Cl. .......... 260/40 R; 260/13; 260/14; 260/15; 260/16; 260/17 R; 260/37 R; 260/37 SB; 260/37 EP; 260/37 N; 260/37 PC; 260/37 AL; 260/38; 260/39 R; 260/42.14; 260/42.15; 260/42.16

[58] Field of Search .......... 260/37 AL, 42.14, 42.15, 260/37 R, 37 SB, 37 EP, 37 N, 37 PC, 38, 39 R, 40 R, 13, 14, 15, 16, 17 R; 428/361, 39 Z

[56] References Cited

U.S. PATENT DOCUMENTS

| | | | |
|---|---|---|---|
| 2,909,548 | 10/1959 | Bailey et al. | 260/448 Z |
| 3,234,042 | 2/1966 | Marzocchi et al. | 260/42.18 |
| 3,383,435 | 5/1968 | Cizek | 260/874 |
| 3,507,832 | 4/1970 | Davis et al. | 260/47 |
| 3,594,993 | 7/1971 | Heyse | 260/42.18 |
| 3,650,818 | 3/1972 | Marzocchi | 260/42.16 |

FOREIGN PATENT DOCUMENTS 1010043 11/1965 United Kingdom .

OTHER PUBLICATIONS

Modern Plastics Encyclopedia 1966, pp. 447 & 479, Sep. 1965.

Murphy, Am. Chem. Society, 25 Anniversary Edition, pp. 76-90, Sep. 1965.

Chemical Abstracts, 14167a, vol. 68, 1968.

Hattori et al., Plastics Design & Processing, Aug. 1967.

Modern Plastics Encyclopedia 1967, Sep. 66, vol. 44, No. 1A, pp. 416, 417 & 457.

Encyclopedia of Polymer Science & Tech., vol. 7, p .35.

*Primary Examiner*—James H. Derrington

*Attorney, Agent, or Firm*—Morgan, Finnegan, Pine, Foley & Lee

[57] ABSTRACT

Filamentous glass in which the filaments are sized with non-burning or self-extinguishing polymeric compositions reinforce the physical properties of organic polymeric substances and impart a degree of flame retardance to glass-resin composites greater than that expected from the sizing content. There are provided molding compositions and injection molding granules containing resins and dispersions of such reinforcements and non-burning or self-extinguishing three-dimensional articles comprising resins containing such reinforcements.

44 Claims, No Drawings

GLASS REINFORCEMENTS AND FIRE RETARDANT GLASS-RESIN COMPOSITES THEREFROM

This is a continuation of application Ser. No. 100,441, filed Dec. 21, 1970, now abandoned.

This invention relates to filamentous glass reinforcements for plastics. More particularly, it pertains to filamentous glass coated with a fire retardant sizing, to molding compositions containing such glass reinforcement and to articles produced by shaping such compositions.

BACKGROUND OF THE INVENTION

Glass reinforced organic polymeric substances are widely used materials, many of them successfully competing with metals because of their exceptional mechanical properties and ease of processing. The glass in such products is a reinforcement rather than a simple filler because the glass-resin composite derives its strength from the filaments of glass, much like concrete is reinforced with metal, e.g., steel, so that the two materials act together in resisting forces.

It is essential to the achievement of maximum properties in glass-reinforced plastics that the resin, i.e., organic polymeric substance, wet the glass, i.e., there should be good bonding between such substance and the glass filaments. Most plastic substances do not bond well to glass, so it is an accepted practice to coat the glass filaments with an intermediate layer of a sizing substance which wets and adheres to the glass and which is compatible with the superjacent plastic substance.

Many glass reinforced plastics have excellent short-term as well as long-term temperature resistance. Most of them have high strength and toughness and some have remarkably good hydrolytic stability and excellent electrical properties. The increasing number of end uses—as metals are displaced—requires considerable attention to improving the fire retardancy of glass reinforced composite materials. Fire retardancy is a critical requirement in automotive and electrical uses and in the construction industry.

The main factor which determines the fire resistance of a glass-resin composite is the resin itself. There are wide variations in the burning rate among the common resins. Shellac and cellulose esters, for example, burn readily at comparatively low temperatures. Styrene resins, on the other hand, burn slowly and they drip. Still other resins such as vinyl resins, e.g., poly(vinyl halides); polyphenylene oxide; and polycarbonates, are self-extinguishing, i.e., they will melt or disintegrate without actually burning, or will burn only if exposed to direct flame. In most cases, however, it is necessary to compound certain chemicals into all resins used in glass-resin composites to reduce or eliminate the tendency of the composite to burn and drip. Such chemicals are known as flame-retardant additives, e.g., for polyethylene and similar resins, antimony trioxide and chlorinated paraffins are useful flame-retardant additives.

A primary, but obscure, factor involved in the tendency of glass-resin composite to burn, even if the resin is self-extinguishing per se, is the lack of fire resistance of the glass filamentous reinforcement. Of course, it is not likely that the glass filaments per se would promote burning of the composite material under most conditions, in spite of their very large surface area. However, the conventional sizing compounds, which cover the fine glass filaments have unexpectedly now been found to constitute a large flammable surface area, with the result that composites reinforced with conventionally sized filamentous glass contribute a vulnerability to flame attack out of all expected proportion to the quantities of sizing used. For example, a typical composite may contain 30 percent by weight of glass which is coated with 1.5 percent by weight of the glass of a combustible glass size, e.g., polyvinyl acetate or polyester. Such a composite, even though it contains only 0.4 percent by weight of sizing, cannot easily meet the requirements for classification as a self-extinguishing and non-dripping article according to ASTM test method D-635 and Underwriters' Laboratories Bulletin No. 94. This is true even if the resin per se in the composite is self-extinguishing and non-dripping. It is, therefore, necessary and conventional to load the composites with a relatively high amount of flame-retardant additives. Such composites with large amounts of additives, most of which plasticize the resin to some extent, suffer losses in physical properties, such as heat distortion temperature, and in electrical properties, and are expensive to produce.

It has now unexpectedly been found that glass-resin composites can be rendered flame-retardant by using as a reinforcement, filamentous glass which is coated with a non-burning or self-extinguishing polymeric sizing composition. This technique has two unexpected advantages, which are again seemingly out of proportion to the amount of sizing actually present in the composite: (a) it is possible to use lower amounts of flame-retardant additives with both flammable, e.g., polystyrene, and with non-burning and self-extinguishing, e.g., polycarbonate and polyphenylene oxide, resins superjacent the sized filaments, and (b) it is possible to prepare flame-retardant composites from normally non-burning or self-extinguishing resins, e.g., polyphenylene oxide resins, without the need to add flame-retardants to the resin.

For the purposes of this disclosure and the appended claims, the term "non-burning or self-extinguishing" contemplates properties measured by such tests as ASTM D-635 and that described in Underwriters' Bulletin No. 94. More particularly, in the latter test, a molded piece of about 2½" by ½" by ⅛" is formed from the reinforcement and the resin and if it does not drip upon ignition and will extinguish itself within 30 seconds, after two 10-second ignitions, the composite is deemed to be flame-retardant to the point where it satisfies the requirements set forth by the Underwriters' Laboratories. Test ASTM D-635 for flammability comprises contacting the end of a specimen ½" by 5" and "thickness normally supplied" with a Bunsen burner flame for 30 seconds; and repeating if there is no ignition. If the specimen does not ignite, it is classified "non-burning by this test". If the specimen does ignite but does not continue burning to the 4" mark, after the flame is removed, it is classed as "self-extinguishing by this test."

It is, accordingly, a primary object of this invention to provide filamentous glass reinforcements for non-burning or self-extinguishing glass-resin composites.

It is a further object of this invention to provide molding powders suitable to prepare non-burning or self-extinguishing glass-resin composites in any desired form.

Still another object of this invention is to provide three dimensional reinforced glass-resin composite articles which are non-burning or self-extinguishing.

A further object of this invention is to provide glass-resin composites with excellent flame-retardant properties using lower amounts of flame-retardant additives than heretofore.

Still another object of the invention is to provide glass-resin composites with flame-retardant properties using self-extinguishing resins and no flame-retardant additives.

DESCRIPTION OF THE INVENTION

The above stated objects and advantages and others apparent to those skilled in the art after consideration of this disclosure will be secured with the novel composition of matter comprising a reinforcement for polymeric materials comprising filamentous glass, i.e., fibrous glass in filaments or bundles of filaments, and the like, in which the filaments are uniformly coated with a non-burning or self-extinguishing sizing composition. "Non-burning" and "self-extinguishing" have been defined above.

The filamentous glass to be employed is well known to those skilled in the art and is widely available from a number of manufacturers. For electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the filaments and whether or not they are bundled into fibers and the fibers bundled in turn to yarns, ropes or rovings, or woven into mats, and the like, are also not critical to the invention. However, in the preparation of the plastic molding compositions of this invention, it is convenient to use the filamentous glass in the form of chopped strands of from about ⅛" to about 2" long. In the molded articles, on the other hand, even shorter lengths will be encountered because during compounding, considerable fragmentation will occur. This has been found to be desirable, however, because the best molded properties seem to be exhibited by thermoplastic injection molded articles in which the instant reinforcement has filament lengths of between about 0.000005" and 0.125 (⅛)".

Among the embodiments of the invention will be a reinforcement in which the filaments of glass are uniformly sized with a non-burning or self-extinguishing thermoplastic or thermosetting or cross-linked resin. Such resins are well known to those skilled in the art. For example, a thermoplastic halogenated vinyl polymer, such as polyvinylidene chloride or poly(chlorostyrene) can be used. Suitable also are non-burning, self-extinguishing thermoset or cross-linked halogenated epoxy or halogenated polyester resins. Suitable resins of this type are polyesters derived from a halogenated dicarboxylic acid or anhydride, wherein halogen is bromine or chlorine (e.g., HETRON resins, Durez Div., Hooker Chemical Corp.) and polyepoxides made by substituting tetrabromobisphenol A for bisphenol-A in the usual epoxy formulation. Epoxy resins can also be cured with chlorendic anhydride to obtain a series of known flame retardant chlorine-containing epoxy resins suitable for preparing the reinforcements of this invention.

The advantages of this invention are also secured with an embodiment comprising filamentous glass in which the filaments are coated with a sizing composition comprising a thermoplastic or thermosetting or cross-linked resin and a flame-retardant additive in an amount sufficient to render the resin non-burning or self-extinguishing.

The amount of flame-retardant additive used is not critical to the invention, so long as it is at least sufficient to render the resin non-burning or self-extinguishing. The same factors apply when the resin of the composite (as distinguished from the resin in the sizing) is rendered non-burning or self-extinguishing with a flame-retardant additive. Those skilled in the art are well aware that the amount will vary with the nature of the resin and with the efficiency of the additive. In general, however, the amount of additive will be from 0.5 to 50 parts by weight per hundred parts of resin. A preferred range will be from about 3 to 25 parts and an especially preferred range will be from about 6 to 10 parts of additive per 100 parts of resin. Readily flammable resins, e.g., shellac and cellulosics require the most additive; slow burning resins, e.g., styrene resins require intermediate amounts; and self-extinguishing resins, e.g., polyphenylene oxides and polyvinyl halides, require the least amounts of flame-retardant additives. On the other hand, smaller amounts of compounds highly concentrated in the elements responsible for flame-retardance will be sufficient, e.g., elemental and phosphorus will be preferred at 0.5 to 2.0 parts by weight per hundred parts of resin, while phosphorus in the form of triphenyl phosphate will be used at 25 parts of phosphate per part of resin, and so forth.

Suitable thermoplastic resins for the sizing comprise acetal resins; acrylics, such as methyl acrylate; cellulosic resins, such as ethyl cellulose, cellulose acetate, cellulose propionate, cellulose acetate butyrate, cellulose nitrate and the like; chlorinated polyethers; nylon, and other polyamides; polyethylene; polystyrene; styrene copolymers, such as styrene-ethyl acrylate copolymer, acrylonitrile-styrene copolymer and acrylonitrilebutadiene-styrene terpolymers; polycarbonates; polyphenylene oxide; polysulfones; polychlorotrifluoroethylene; and vinyl polymers and copolymers, such as vinyl acetate, vinyl alcohol, vinyl butyral, vinyl chloride, vinyl chloride-acetate copolymer, vinylidene chloride and vinyl formal.

Among the thermosetting or cross-linkable resins for the sizing may be mentioned allyl phthalate; furane; melamine-formaldehyde; phenol formaldehyde and phenol-furfural copolymer, alone or compounded with butadiene acrylonitrile copolymer or acrylonitrile-butadiene-styrene copolymers; polyacrylic esters; silicones; urea formaldehydes; epoxy resins; allyl resins; glyceryl phthalates; polyesters; and the like.

Preferred thermoplastic resins for the sizing compositions comprise vinyl or condensation polymers such as styrene resins, allyl resins, acrylate resins, methacrylate resins, vinyl ester resins, as well as aromatic polycarbonate resins; polyacetal resins, polyamide resins, polyphenylene oxide resins, and the like. A preferred thermoplastic resin is polystyrene. Preferred thermosetting or cross-linked resins comprise polyesters and epoxies.

The flame-retardant additives useful in this invention comprise a family of chemical compounds well known to those skilled in the art. Generally speaking, the more important of these compounds contain chemical elements employed for their ability to impart flame resistance. e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds. In certain instances, e.g., with phenolics, boron and hydrated alumina can also be used.

Among the useful halogen-containing compounds are those of the formula

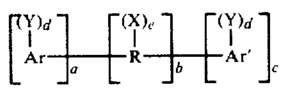

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur containing linkage, e.g., sulfide, sulfoxide, sulfone; a phosphorus-containing linkage; and the like. R can also consist of two or more alkylene or alkylidene linkages connected by such groups as aromatic, amino, ether, carbonyl, sulfide, sulfoxide, sulfone, a phosphorus-containing linkage, and the like. Other groups which are represented by R will occur to those skilled in the art.

Ar and Ar′ are mono- or polycarbocyclic aromatic groups such as phenylene, biphenylene, terphenylene, naphthylene, and the like. Ar and Ar′ may be the same or different.

Y is a substituent selected from the group consisting of organic, inorganic or organometallic radicals. The substituents represented by Y include (1) halogen, e.g, chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar′. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar′ can be varied in the ortho, meta or para positions on the aromatic rings and the groups can be in any possible geometric relationship with respect to one another.

Included within the scope of the above formula are biphenyls of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,6-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by 1,3-dichlorobenzene, 1,4-dibromobenzene, 1,3-dichloro-4-hydroxybenzene and biphenyls such as 2,2′-dichlorobiphenyl, 2,4′-dibromobiphenyl, and 2,4′-dichlorobiphenyl.

The preferred halogen compounds for this invention are aromatic halogen compounds such as chlorinated benzene, chlorinated biphenyl or a compound comprising two phenyl radicals separated by a divalent alkylene group and having at least two chlorine atoms per phenyl nucleus.

In general, the preferred phosphate compounds are selected from elemental phosphorus or organic phosphonic acids, phosphonates, phosphinates, phosphonites, phosphinites, phosphene oxides, phosphenes, phosphites or phosphates.

Typical of the preferred phosphorus compounds to be employed in this invention would be those having the general formula

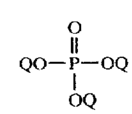

where each Q represents the same or different radicals including hydrocarbon radicals such as alkyl, cycloalkyl, aryl, alkyl substituted aryl and aryl substituted alkyl; halogen; hydrogen and combinations thereof provided that at least one of said R's is aryl. Typical examples of suitable phosphates include, phenylbisdodecyl phosphate, phenylbisneopentyl phosphate, phenylethylene hydrogen phosphate, phenyl-bis-(3,5,5′-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)phenyl phosphate, tri(-nonylphenyl)phosphate, phenylmethyl hydrogen phosphate, di(dodecyl) p-tolyl phosphate, tricresyl phosphate, triphenyl phosphate, dibutylphenyl phosphate, 2-chloroethyldephenyl phosphate, p-tolyl bis(2,5,5'-trimethylhexyl) phosphate, 2-ethylhexyldiphenyl phosphate, diphenyl hydrogen phosphate, and the like. The preferred phosphates are those where each R is aryl. The most preferred phosphate is triphenyl phosphate.

Also suitable as flame-retardant additives for this invention are compounds containing phosphorus-nitrogen bonds, such as phosphonitiilic chloride, phosphorus ester amides, phosphoric acid amides, phosphonic acid amides, phosphinic acid amides, tris(aziridinyl)phosphine oxide or tetrakis(hydroxymethyl)phosphonium chloride. These flame-retardant additives are commercially available.

The organic chlorinated compounds may be used with synergists, such as antimony oxide, in accordance with well known procedures to obtain enhanced flame-retardancy or adequate flame-retardancy with lower contents of chlorine compounds. Moreover, the organic chlorine compounds can be used in admixture with an organic phosphorus compound to obtain enhanced flame-retardancy.

The present invention also includes filamentous glass reinforcements wherein the polymerized sizing compound comprises a non-burning or self-extinguishing thermoplastic or thermosetting resin and a flame-retardant additive, as defined above.

It should be appreciated that, as is well known to those skilled in the art, other conventional ingredients can be included in the sizing compound. For example, for their desired and expected effects there can be added the usual and customary amounts of coupling agents, e.g., silanes or chromes, lubricants, e.g., butyl stearate, calcium stearate or zinc stearate and antistatic agents, e.g., amines, quaternary ammonium compounds, and anionic materials, all of which are commercially available for this purpose.

The filaments of glass can be coated with the non-burning or self-extinguishing polymerized sizing compound in a number of ways. For example, the coating can be put down on filamentous glass, the filaments of which already contain a protective surface coating, previously applied during manufacture. On the other hand, such previously applied coatings can be removed from the filaments, e.g., by heat cleaning, and then the sizing composition can be applied to the bare filaments. Or, the sizing composition according to this invention can be applied instead of conventional binders to the filaments at the point of manufacture as they are mechanically or otherwise pulled from the forming orifice and gathered into bundles or strands.

In one way of proceeding, filamentous glass is coated by immersing it in solvent solution or aqueous emulsion of whatever ingredients are desired in the final sizing composition, then removing and drying the fibrous material to evaporate the water or solvent from the glass.

In such a process, the emulsion or solution with which the glass filaments are coated may contain, for example, from about 1 to 25 percent by weight of the desired coating ingredients. Any solvent may be employed, provided it is non-reactive with the glass filaments and the ingredients in the composition. Drying of the filaments after removal from the solution may take place in air at ambient or elevated temperatures. This operation can be repeated, if necessary, until the desired coating thickness has been achieved.

It has been found that the polymeric sizing composition should be uniformly coated on the filaments and should constitute from about 0.5 to 15 percent by weight of the glass. However, concentrations of from about 1.0 to 5 percent by weight give the best results and, accordingly, this constitutes a preferred range.

The advantages of this invention are secured with an embodiment which is a molding powder comprising particles of resin having dispersed therein a reinforcement comprising filamentous glass in which the filaments of glass are uniformly coated with a non-burning or self-extinguishing polymerized sizing composition. The reinforcement for this embodiment has been defined above.

The term "molding powder" is used in its art-recognized sense to include powders, granules, diced cubes, chopped mats and similar shapes used to fill cavity, transfer, compression, injection and similar molds. Such powders result from compounding resins with filamentous glass reinforcements by standard techniques, such as milling, Banburying, extruding, chopping, blending, grinding and the like.

Preferred molding powders are those in which the resin component is a thermoplastic or a thermosettable or a cross-linkable resin.

Among suitable thermoplastic resins for the molding compounds, there may be mentione acrylonitrile-butadiene-styrene resins; acetal resins; acrylic resins; methacrylic resins; cellulosic resins; chlorinated polyether resins, polyolefin resins, e.g., linear polyethylene, polypropylene, ethylene copolymers and the like; fluoroplastic resins; ionomer resins; methylpentene polymer resins; nylons and other polyamide resins; polyphenylene oxide resins; polyallomer resins; polycarbonate resins; polyester resins; polysulfone resins; silicone resins; styrene resins, e.g., homopolystyrene, styrene-butadiene copolymer, and other styrene copolymers, and the like; urethane resins; vinyl resins, e.g., poly(vinyl chloride), poly(vinylidene chloride), poly(vinylacetate), poly(vinyl butyrate) and the like. All of these thermoplastic resins are well known and all are commercially available. The preferred thermoplastic resins for practicing this aspect of the invention are polyphenylene oxide resin, styrene resins, polyolefin resins, polyamide resins, polyacetal resins and polycarbonate resins. Especially preferred are polyphenylene oxide resins, disclosed e.g., in A. S. Hay, U.S. Pat. No. 3,306,874-5; polystyrene; rubber-modified high impact polystyrene; and the thermoplastic composition consisting of a polyphenylene oxide resin and a styrene resin which is disclosed in E. P. Cizek, U.S. Pat. No. 3,383,435.

The preferred polyphenylene oxide resins are of the formula

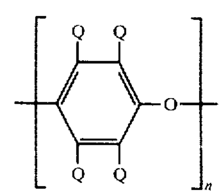

where the oxygen ether atom of one unit is connected to the benzene nucleus of the next repeating unit, n is a positive integer and is at least 100 and each Q is a monovalent substituent selected from hydrogen, halogen, hydrocarbon radicals free of a tertiary alphacarbon atom, halohydrocarbon radicals having at least two carbon atoms between the halogen atom and phenyl nucleus and being free of a tertiary alpha-carbon atom, and halohydrocarbonoxy radicals having at least 2 carbon atoms between the halogen atom and phenyl nucleus and being free of a tertiary alpha-carbon atom. The most preferred polyphenylene oxide resin is poly-(2,6-dialkyl-1,4-phenylene)oxide. These can be prepared by reacting oxygen with a substituted phenol in the presence of a copper catalyst as described in the above-mentioned Hay patents.

The preferred styrene resins have at least 25 percent polymer units derived from a compound of the formula:

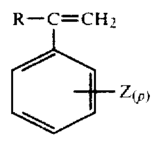

where R is hydrogen, (lower)alkyl or halogen; Z is vinyl, hydrogen, chlorine or (lower)alkyl of up to 6 carbon atoms, and p is a whole number of from 0 to 5. The term "styrene resin" includes, by way of illustration, homopolystyrene and polychlorostyrene, modified polystyrene such as rubber-modified polystyrenes, styrene-acrylonitrile copolymers (SAN), styrene butadiene copolymers, styrene-acrylonitrile-alpha-alkylstyrene terpolymers, acrylonitrile-butadiene-styrene terpolymers (ABS), poly alpha-methylstyrene, copolymers of ethylvinyl benzene and divinyl benzene, and the like. These are all commercially available.

Suitable compositions of polyphenylene oxide resin and styrene resin will contain from 1.0 to 99 percent of the polyphenylene oxide resin and from 99 to 1.0 percent of the styrene resin. In preferred compositions the polyphenylene oxide constitutes from 40 to 85 percent by weight of the resin composition.

Among suitable thermosettable or cross-linkable resins for the molding compounds there may be mentioned alkyd resins, allyl resins, amino resins, epoxy resins, furane resins, melamine resins, phenolic resins, polyester resins, silicone resins, urea resins, urethane resins, and the like. All of these thermosettable and cross-linkable resins are well known and are commercially available.

According to one feature of this aspect of the invention, the sizing composition in the molding powder will be non-burning or self-extinguishing thermoplastic or thermosetting or cross-linked resin, as defined above. According to another feature, the sizing can comprise a thermoplastic or thermosetting resin and a flame-retardant additive in an amount, e.g., from 0.5 to 50 parts by weight per hundred of resin, at least sufficient to render the sizing non-burning or self-extinguishing. Of course, more than the minimum amount can be used and this will assist in rendering the composite non-burning or self-extinguishing. According to still another feature of this invention, the sizing composition will comprise a non-burning or self-extinguishing thermoplastic or thermosetting or cross-linked resin and a flame-retardant additive, as above-defined.

The molding compositions can be prepared by a number of procedures. In one way, chopped glass roving (a bundle of strands of filaments) is sized with the composition of this invention before or after chopping into small pieces, e.g., ¼" to 2" in length and put into an extrusion compounder with the resin to produce molding pellets. The fibers are shortened and predispersed in the process, coming out at less than 1/16" long. In another procedure, sized glass filaments according to this invention are ground or milled to short lengths, and are mixed with the resin by dry blending then either fluxed on a mill and ground, or they are extruded and chopped. In still another procedure the glass roving sized with the composition of this invention is drawn through a bath of molten resin which coats the filaments and the resin-glass strand is chopped into small cylinders, ¼" or longer, to form the molding compound. The sized fibers can also be mixed with resin and directly molded, e.g., by injection or transfer molding techniques.

In general, best properties will be obtained if the sized filamentous glass reinforcement comprises from about 5 to about 60 percent by weight of the molding powder and the sizing composition comprises from about 0.5 to about 15 percent by weight of the reinforcement. However, it is useful also to prepare such molding compounds containing substantially greater quantities, e.g., up to 80–90 percent by weight of glass reinforcement. These concentrates can then be custom blended with resins that are not glass reinforced to provide any desired glass content of a lower value.

Important embodiments of this invention comprise injection molding compounds in the form of granules having therein from about 5 to 60 percent by weight of the granule of glass filaments, said filaments being coated with a non-burning or self-extinguishing polymerized sizing composition and a superjacent thermoplastic molding composition.

The granules can be of any desired shape or size conventional for use in injection molding machines. Preferred are those which are cubed, diced, cylindrical, pillow shaped, and the like, having overall dimensions of from about 1/16th to about 2 inches and especially preferably from 1/16th to ⅜th inch in length and width.

The granules can be produced in any conventional manner, such as those described above. One convenient way is to provide the reinforcement in about ⅛th inch lengths (i.e., chopped rovings) and to feed it to the feed hopper of an extruder along with the thermoplastic in finely divided form. The mixture is worked in the extruder at an elevated temperature, e.g., from 450 to 650° F., i.e., sufficient to flux the resin, e.g., for polycarbonate and polyphenylene oxide about 550° F. is used, for styrene resin, lower temperatures can be used. If desired, flame-retardant additives for the resin component of the composite can be introduced at this point too. As the chopped glass strands advance through the extruder they are further chopped and broken up into shorter lengths and bundles are separated into filaments. The emerging extrudate is cooled and, for example, die-face pelletized into pellets of about ⅛ in. in length as it leaves the extruder through ⅛ in. diameter holes in the end plate.

Other conventional methods can also be used to make the injection molding granules of this invention. For example, a cross-head extruder can be used to impregnate and coat strands of sized glass filaments by drawing them through molten thermoplastic and then the coated strands can be chopped to lengths and used as injection molding granules. In these the fibers and filaments will run longitudinally of the granule axis, from end-to-end. On the other hand, the fibers of any desired length can be dispersed uniformly in a thermoplastic composition, by dry-blending or with added solvent, and the resulting mass can be heated and mixed, then cooled, and cut into molding granules.

The thermoplastic molding resins used to prepare the injection molding granules can be any of those conventionally used and above illustrated.

As mentioned above, the sizing compound can comprise a conventional combustible thermoplastic or thermosetting resin and a fire-retardant additive or a non-burning or self-extinguishing thermoplastic or thermosetting resin with or without a flame-retardant additive. Although the amount is not critical, it is preferred that the coating of sizing consitute from 0.5 to 15 percent by weight of the glass filaments in the granule.

An important embodiment of this invention comprises three-dimensional articles comprising a resin having dispersed therein a reinforcement which comprises filamentous glass in which the filaments of said glass are uniformly coated with a non-burning or self-extinguishing polymerized sizing compound.

This embodiment includes the molding powders and injection molding granules above-disclosed. In addition, it includes bars and other shapes made from such compounds, as will be hereinafter exemplified. Furthermore, it includes useful manufactured articles containing a resin and the reinforcement provided by this invention. These articles have surprisingly improved fire-retardancy because they include the novel reinforcement of this invention. Such three-dimensional articles include, for example, molded parts such as spur, helical, worm or bevel gears, ratchets, bearings, cams, impact parts, gaskets, valve seats, sheets, tubes and rods, cable terminals, terminal blocks, backing for electrical circuits, panel boards for printed circuits, transformer coil spacers, instrument housings, appliance cabinets, and, in general, all parts in which reinforced plastics can be used.

In this embodiment, the resin can be thermoplastic or thermosetting, as above-defined. The resin can also be non-burning or self-extinguishing, as above-defined.

Preferred resins comprise a polyphenylene oxide resin; a styrene resin, a polyolefin resin, a polyamide resin, a polyacetal resin or a polycarbonate resin, as above defined. Especially preferred resins are polystyrene; rubber-modified high impact polystyrene resin; or a composition consisting of polyphenylene oxide resin and a styrene resin.

The three-dimensional articles include those in which the sizing comprises a non-burning or self-extinguishing thermoplastic or thermosetting resin, or a combustible resin rendered non-burning or self-extinguishing with a flame-retardant additive, as above defined. Also included are those containing sizing comprising a non-burning or self-extinguishing thermoplastic or thermosetting resin and a flame-retardant additive.

The most preferred articles are those in which the reinforcement comprises from about 5 to about 60 percent by weight of the article and the sizing composition constitutes from about 0.5 to 15 percent by weight of the reinforcement.

Any conventional molding procedure can be used to prepare the three-dimensional articles of this invention. Compression or transfer molding are preferred with thermosets. Potting is preferred with cross-linkable resins. Injection molding is preferred with thermoplastics. Temperatures, pressures and other techniques will be varied and selected to accommodate the resin in accordance with well-understood techniques of the art.

DESCRIPTION OF THE PREFERRED EMBODIMENTS

The following examples illustrate the invention. They are set forth as a further description of this invention, but are not to be construed as limiting the invention thereto.

EXAMPLE 1

Fibrous glass in the form of ⅛ inch chopped glass rovings (P-883, manufactured by Owens Corning Fiberglass Corp., and as, received, lightly sized with dextrinized starch) is divided into two batches. Two epoxy resin compositions are prepared, one of them containing a measured amount of a heavily chlorinated biphenyl, containing more than 2 chlorine atoms per phenyl nucleus, (AROCHLOR 1268, Monsanto Co.). One batch of glass is uniformly coated with epoxy resin alone; the other batch of glass is uniformly coated with the same resin containing the chlorinated biphenyl fire-retardant additive. The batches are heated until thoroughly dry and free-flowing to provide a glass reinforcement uniformly coated with a thermoset, cross-linked resin and a glass reinforcement according to this invention uniformly coated with a thermoset, cross-linked resin containing sufficient flame-retardant additive to render the sizing non-burning or self-extinguishing.

Each batch is mechanically blended with a resin composition comprising polyphenylene oxide resin and polystyrene resin (Cizek, U.S. Pat. No 3,383,435; NORYL, General Electric Co.) 700 parts by weight, chlorinated biphenyl (AROCHLOR 1268) 100 parts by weight; and antimony oxide, 40 parts by weight, the amount of reinforcement used being sufficient to provide 30 percent by weight in the total composition. The blends are extruded at 580° F. into strands and are chopped into molding powders in granular form. One of the powders comprises particles of a non-burning and self-extinguishing blend of polyphenylene oxide resin and styrene resin and a reinforcement sized with a combustible epoxy sizing. The other, according to this invention, contains reinforcement sized with the non-burning and self-extinguishing epoxy sizing.

Three-dimensional articles comprising test bars measuring 1/16"×½"×2½" are injection molded at 530° F. in a 3 oz. Newbury machine from each molding powder and these bars are subjected to a flammability test.

The tests are carried out following Underwriters' Laboratories Subject 94 procedures. A minimum of three bars from each material are tested for burning time after two ignitions. After each (10-second) ignition, the test bar must extinguish itself within 30 seconds, and the bar may not drip during the burning, to be classed as non-burning or self-extinguishing. In the present case, the relative fire-resistance in such materials is to be compared, so the actual readings in seconds are averaged and this number is called the average burning time. For the bars prepared as described above, the results are as follows:

| Glass sizing in the resin-glass composite | ⅛" U.L. 94 Test Results (sec.) | Average Burning Time (sec.) |
|---|---|---|
| Epoxy sizing without the chlorinated biphenyl | 4/25 4/15 3/25 | 12.6 |

-continued

| Glass sizing in the resin-glass composite | 1/8" U.L. 94 Test Results (sec.) | Average Burning Time (sec.) |
|---|---|---|
| Epoxy sizing with the chlorinated biphenyl | 1/13 3/4 2/20 | 8.6 |

It can be seen that the composite containing the sizing according to this invention burns for a significantly shorter time compared to the composite containing the combustible sizing.

EXAMPLE 2

The procedure of Example 1 is repeated substituting for the P-883 glass, glass fibers containing about 1.2 percent by weight of a thermoplastic styrene ethyl acrylate copolymer sizing material (HR-3250, manufactured by Pittsburgh Plate Glass Co.). The glass is divided into two batches. One batch is reserved for control purposes, and to the other is applied a measured amount of a chlorinated biphenyl (AROCHLOR 1268) by dispersing the glass in a chloroform solution of the chlorinated biphenyl compound then evaporating the solvent for 4 to 5 hours in a forced air oven until the glass is dry and free-flowing.

Each of said batches of reinforcement is compounded with NORYL resin to provide 30 percent by weight of reinforcement in the composite and extruded and chopped into molding powders.

Test bars injection molded from these compounds are subjected to the Underwriters' Laboratories burning test with the following results:

| Glass sizing in the resin-glass composite | 1/8" U.L. 94 Test Results (sec.) | Average Burning Time (sec.) |
|---|---|---|
| HR-3250 glass sizing (regular) without chlorinated biphenyl | 5/19 5/17 3/8 | 9.5 |
| HR-3250 glass sizing with chlorinated biphenyl | 4/16 4/2 4/3 | 3.8 |

The composite containing glass coated with the flame-retardant sizing is substantially more resistant to fire than the composite containing the conventional HR-3250 thermoplastic sizing.

EXAMPLE 3

Two polymerizable sizing compositions are prepared having the following compositions:

| | | | |
|---|---|---|---|
| A. | Polyester Resin HETRON PRI-30 | 100 | parts by weight |
| | Cobalt Naphthenate | 0.2 | parts by weight |
| | MEK Peroxide | 1.0 | parts by weight |
| B. | Polyester Resin HETRON PRI-30 | 100 | parts by weight |
| | Cobalt Naphthenate | 0.2 | parts by weight |
| | MEK Peroxide | 1.0 | parts by weight |
| | AROCHLOR 1268 | 25 | parts by weight |

HETRON PRI-30 is a fire-retardant polyester resin manufactured by Durez Div., Hooker Chemical Corp. MEK Peroxide is methylethylketone peroxide, a curing agent for the polyester composition. Cobalt naphthenate is an accelerator for curing the composition. AROCHLOR is a chlorinated biphenyl as described above.

The sizing compositions, 7.5 parts by weight, are dissolved in 150 parts by weight of chloroform. The solutions are poured over two 300 gram batches of P-883 fibrous glass making sure that a complete and uniform wetting is obtained. The glass is stirred allowing the solvent to evaporate. Then the fibers, now containing approximately 2.5% of the polyester sizing material, are dried overnight at room temperature and for two additional hours at 100° C.

The two glass fiber reinforcements, having the fire-retardant polyester coatings, one of them containing additional flame-retardant, are dry blended with the following materials:

NORYL resin: 700 parts by weight
AROCHLOR 1268: 100 parts by weight
Antimony Oxide: 40 parts by weight The resulting mixtures are extruded into molding pellets at 580° F. using a 3/4" Wayne extruder. The pellets are molded into 1/8"×1/2"×2 1/2" test bars employing a 3 oz. Newbury injection molding machine. The molding is done at 530° F.

The fire resistance of these glass reinforced composites is evaluated following U.L. Subject 94 procedures. The results are as follows:

| Glass sizing in the resin-glass composite | 1/8" U.L. 94 Test Results (sec.) | Average Burning Time (sec.) |
|---|---|---|
| Polyester sizing without the fire retardant additive (A) | 4/25 4/23 3/16 4/33 14/4 | 14.0 |
| Polyester sizing with the fire retardant additive (B) | 3/9 7/15 4/15 3/5 3/20 | 8.4 |

The average burning time for the composite containing the fire-retardant additive in the sizing composition is substantially shorter than that without the additive.

EXAMPLE 4

The procedure of Example 3 is repeated substituting for the polyester sizing:

A. polystyrene resin.

B. a poly(o,p-monochlorostyrene) resin.

The first sizing material (A) represents a material which burns readily. The second material (B) represents a material which, due to the presence of chemically bonded chlorine, has a relatively high level of flame-retardance.

The two glass reinforced, self-extinguishing resin-glass composites, prepared exactly as outlined under Example 3, have the following burning characteristics:

| Glass sizing in the resin-glass composite | 1/8" U.L. 94 Test Results (sec.) | Average Burning Time (sec.) |
|---|---|---|
| Polystyrene, without a fire-retardant component (A) | 6/5 13/7 4/8 18/10 4/5 7/14 | 8.4 |
| Polystyrene containing chemically bonded chlorine (B) | 2/7 2/5 4/5 2/3 3/6 4/8 | 4.2 |

The average burning time of the composite containing a reinforcement coated with a fire retardant sizing is substantially shorter than the composite with a combustible sizing.

EXAMPLE 5

In this example a fire-retardant additive is applied to a conventional sizing of glass fibers and a composite formed therefrom is compared with one containing glass fibers without such an additive.

One and one-half grams of chlorinated biphenyl (AROCHLOR 1268) is dissolved in 150 grams of chloroform. As in Example 3, this solution is poured over 300 grams of chopped glass fibers (CS-510X, manufactured by the Johns-Manville Corp.) followed by stirring the glass, evaporating the solvent and drying the glass as described. The flame-retardant additive is thus deposited on an existing glass sizing in a thin layer, and is believed to penetrate the existing glass sizing material to some extent.

The chlorinated biphenyl-treated glass, and a control sample of CS-510X without the flame-retardant additive, are blended into a resin having the following composition:

NORYL resin: 700 parts by weight
AROCHLOR 1268: 100 parts by weight
Antimony Oxide: 40 parts by weight The U.L. 94 burning test gives the following results:

| Glass sizing in the resin-glass composite | $\frac{1}{8}$" U.L. 94 Test Results (sec.) | Average Burning Time (sec.) |
|---|---|---|
| CS-510X glass sizing (regular) without a chlorinated biphenyl | 5/12 12/4 4/12 4/25 | 11.0 |
| CS-510X glass sizing with chlorinated biphenyl | 4/8 3/5 3/3 4/6 | 4.5 |

The composite containing reinforcement sized with a resin containing chlorinated biphenyl burns for a substantially shorter time than that sized with the conventional sizing.

EXAMPLE 6

The procedure of Example 5 is repeated, substituting for the CS-510X fibers, 133-A glass fibers manufactured by the Owens Corning Fiberglass Corporation.

The burning test results are as follows:

| Glass sizing in the resin-glass composite | $\frac{1}{8}$" U.L. 94 Test Results (sec.) | Average Burning Time (sec.) |
|---|---|---|
| 133-A glass sizing (regular) without chlorinated biphenyl | 5/14 9/1 7/22 | 9.6 |
| 133-A glass sizing with chlorinated biphenyl | $\frac{3}{4}$ 3/12 3/6 2/10 2/5 4/4 | 4.8 |

It can be seen that the burning time is substantially shorter when the glass is uniformly coated with a polymerized sizing composition containing a fire-retardant additive according to this invention.

EXAMPLE 7

The procedure of Example 2 is repeated substituting for the composition of poly(2,6-dimethyl-1,4-phenylene)oxide resin and styrene resin (NORYL), the following thermoplastic resins:

nylon (polyamide);
polystyrene;
styrene-acrylonitrile;
acrylonitrile-butadiene-styrene;
styrene-butadiene copolymer;
polycarbonate;
polypropylene;
linear polyethylene;
polyacetal;
methyl acrylate;
methyl methacrylate;
vinyl acetate;
polyurethane;
polysulfone;
poly(2,6-dimethyl-1,4-phenylene)oxide;
poly(2,6-diethyl-1,4-phenylene)oxide;
poly(2,6-diphenyl-1,4-phenylene)oxide; and
polyvinyl chloride.

The amount of glass in the composite is 20, 30, 35 and 40 percent by weight. The amount of sizing is varied between 2.0 and 10 percent by weight. The reduction of relative burning times of the composites are similar to those of Example 2.

EXAMPLE 8

The procedure of Examples 2–6 are repeated substituting for the AROCHLOR 1268, the following flame-retardant additives and mixtures thereof:

a mixture of highly chlorinated biphenyl (AROCHLOR 1268) and antimony oxide (1.0:0.4 by weight);
elemental red phosphorus;
triphenyl phosphate;
a mixture of triphenyl phosphate and highly chlorinated biphenyl (1:3.5 by weight);
trichlorobenzene;
2,2-bis-(3,5-dichlorophenyl)propane;
phenyl phosphonic acid;
diphenylphenyl phosphonate;
diphenylphosphinic acid;
triethylphosphine oxide;
triphenylphosphine;
triethylphosphite;
phosphonitrilic chloride;
the amides of phosphorus acid, phosphoric acid, phosphonic acid, and phosphinic acid;
tris(arizidinyl)phosphine oxide; and
tris(hydroxymethyl)phosphonium chloride.

The amounts of the listed additives used are at least sufficient to render the polymeric coating non-burning and self-extinguishing. Elemental phosphorus is used at 0.1 to 5.0 parts per 100.0 parts of polymer. The others are used at 3, 6, 10 and 25 parts per hundred parts of polymer. The reduction in burning times of the composites are similar to those of Examples 2 through 6.

EXAMPLE 9

The procedure of Example 3 is repeated adding to the sizing bath a chrome coupling agent or a silane coupling agent; calcium stearate as a lubricant and a long chain amine as an antistatic agent.

EXAMPLE 10

A composition suitable to prepare flame-retardant and self-extinguishing cross-linked thermoset castings containing the reinforcements prepared by the procedures of Example 3 are made by formulating, a polyester resin, e.g., HETRON PRI-30, Durez Div., Hooker Co., 20 grams; methylethyl ketone peroxide, 0.2 grams; cobalt naphthenate, 0.04 grams; and sized glass reinforcement, 10 grams. The components are mixed until the glass is thoroughly dispersed and then a casting is made. The burning rate of the casting containing the glass coated with the non-burning and self-extinguishing polymeric sizing is substantially reduced in comparison to one containing conventionally sized glass.

Because of their excellent physical, mechanical, chemical, electrical and thermal properties and their enhanced flame resistance, the resin-glass composites of this invention have many and varied uses. The molding powder formulations may be used alone or mixed with other polymers and may contain various fillers, such as wood flour, diatomaceous earth, carbon black, silica, and the like, as well as pigments and dyes, stabilizers, plasticizers, and the like.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. As a new composition of matter, a molding powder comprising particles of resin having dispersed therein a reinforcement comprising filamentous glass in which the filaments of said glass are uniformly coated with a non-burning or self-extinguishing polymerized sizing composition that consists essentially of a thermoplastic or thermosetting resin, a silane or chrome coupling agent and a flame retardant additive, said flame retardant additive being present in an amount that is sufficient to render the composition non-burning or self-extinguishing.

2. A composition as defined in claim 1 wherein said resin is a thermoplastic resin, a thermosettable or cross-linkable resin.

3. A composition as defined in claim 1 wherein said resin is non-burning or self-extinguishing.

4. A composition as defined in claim 1 wherein said resin is a polyphenylene oxide resin.

5. A composition as defined in claim 1 wherein said resin is a styrene resin, a polyolefin resin, a polyamide resin, a polyacetal resin, a polycarbonate resin, or a mixture thereof.

6. A composition as defined in claim 5 wherein said resin is polystyrene.

7. A composition as defined in claim 5 wherein said resin is a rubber-modified high impact polystyrene resin.

8. A composition as defined in claim 1 wherein said resin comprises a thermoplastic composition consisting of a polyphenylene oxide resin and a styrene resin.

9. A three-dimensional article comprising a resin having uniformly dispersed therein a reinforcement which comprises filamentous glass in which the filaments of said glass are uniformly coated with a non-burning or self-extinguishing polymerized sizing composition that consists essentially of a thermoplastic or thermosetting resin, a silane or chrome coupling agent and a flame retardant additive, said flame retardant additive being present in an amount that is sufficient to render the composition non-burning or self-extinguishing.

10. An article as defined in claim 9 wherein said resin is a thermoplastic resin or a thermosetting resin.

11. An article as defined in claim 9 wherein said resin is non-burning or self-extinguishing.

12. An article as defined in claim 9 wherein said resin is a polyphenylene oxide resin.

13. An article as defined in claim 9 wherein said resin is a styrene resin, a polyolefin resin, a polyamide resin, a polyacetal resin, a polycarbonate resin or a mixture thereof.

14. An article as defined in claim 13 wherein said resin is polystyrene.

15. An article as defined in claim 13 wherein said resin is a rubber-modified high impact polystyrene resin.

16. An article as defined in claim 9 wherein said resin comprises a thermoplastic composition consisting of a polyphenylene oxide resin and a styrene resin.

17. An article as defined in claim 9 wherein said polymerized sizing composition consists essentially of a thermoplastic or thermosetting resin and a flame retardant additive, said additive being present in an amount that is at least sufficient to render the composition non-burning or self-extinguishing.

18. An article as defined in claim 9 wherein said reinforcement comprises from about 5 to about 60 percent by weight of said article and said sizing composition comprises from about 0.5 to about 15 percent by weight of said reinforcement.

19. A method of rendering a composition which comprises a normally flammable polyphenylene ether resin and filamentous glass non-burning or self-extinguishing, said method comprising coating said filamentous glass with a non-burning or self-extinguishing polymerized sizing composition that consists essentially of a thermoplastic or thermosetting resin, a silane or chrome coupling agent and a flame retardant additive, said flame retardant additive being present in an amount that is sufficient to render the composition non-burning or self-extinguishing prior to blending the glass filaments into the polyphenylene ether resin.

20. A method as defined in claims 19 wherein said reinforcement comprises from about 5 to about 60 percent by weight of said composition and said sizing composition comprising from about 0.5% to about 15 percent by weight of said reinforcement.

21. In the method of rendering filamentous glass reinforced resin compositions non-burning and self-extinguishing the improvement which comprises providing the filamentous glass reinforcing agent with a non-burning or self-extinguishing polymerized sizing composition that consists essentially of a thermoplastic or thermosetting resin, a silane or chrome coupling agent and a flame retardant additive, said flame retardant additive being present in an amount that is sufficient to render the composition non-burning or self-extinguishing.

22. A method according to claim 21 wherein said resin component is a thermoplastic resin, a thermosettable or cross-linkable resin.

23. A method as defined in claim 21 wherein said resin is a polyphenylene oxide resin.

24. A composition as defined in claim 4 wherein said polyphenylene oxide resin is 2,6-dimethyl (1,4-polyphenylene) oxide.

25. A composition as defined in claim 8 wherein said styrene resin is rubber-modified high impact polystyrene resin.

26. A composition as defined in claim 12 wherein said polyphenylene oxide resin is 2,6-dimethyl (1,4-polyphenylene) oxide.

27. An article as defined in claim 12 wherein said polyphenylene oxide resin is 2,6-dimethyl (1,4-polyphenylene) oxide.

28. An article as defined in claim 16 wherein said styrene resin is rubber-modified high impact polystyrene resin.

29. A composition as defined in claim 1 wherein the flame retardant additive is a halogen-containing compound; a halogen-containing compound in admixture with antimony oxide; elemental phosphorus or a phosphorus compound; or a compound containing phosphorus-nitrogen bonds.

30. An injection molding compound as defined in claim 1 wherein the filaments are coated with a non-burning or self-extinguishing polymerized sizing composition which includes a chlorinated biphenyl or a chlorinated biphenyl in admixture with antimony trioxide.

31. A compound as defined in claim 1 wherein the filaments are coated with a non-burning or self-extinguishing polymerized sizing composition which includes a chlorinated biphenyl or a chlorinated biphenyl in admixtures with antimony trioxide.

32. An article as defined in claim 17 wherein said flame-retardant additive is a halogen-containing compound; a halogen-containing compound in admixture with antimony oxide; elemental phosphorus or a phosphorus compound; or a compound containing phosphorus-nitrogen bonds.

33. A composition as defined in claim 1 wherein the polymerized sizing composition consists of a thermoplastic or thermosetting resin selected from the group consisting of a styrene resin, an alkyl resin, an acrylate resin, a methacrylate resin, an aromatic polycarbonate resin, a polyacetal resin, a polyacetal resin, a polyamide resin, a vinyl ester resin, polyphenylene oxide resin or a mixture thereof and a flame retardent additive in an amount sufficient to render said resin non-burning or self-extinguishing.

34. A composition as defined in claim 33 wherein the polymerized sizing composition includes a thermosetting or cross-linked polyester or epoxy resin.

35. A composition as defined in claim 34 wherein said resin is a polyester resin.

36. A composition as defined in claims 35 wherein said resin is an epoxy resin.

37. As a new composition of matter, a molding powder comprising particles of resin having dispersed therein a reinforcement comprising filamentous glass in which the filaments of said glass are uniformly coated with a non-burning or self-extinguishing polymerized sizing composition that consists essentially of a thermoplastic or thermosetting resin, a chrome coupling agent and a flame retardant additive, said flame retardant additive being present in an amount that is sufficient to render the composition non-burning or self-extinguishing.

38. A three-dimensional article comprising a resin having uniformly dispersed therin a reinforcement which comprises filamentous glass in which the filaments of said glass are uniformly coated with a non-burning or self-extinguishing polymerized sizing composition that consists essentially of a thermoplastic or thermosetting resin, a chrome coupling agent and a glame retardant additive, said flame retardant additive being present in an amount that is sufficient to render the composition non-burning or self-extinguishing.

39. An article as defined in claim 38 wherein said polymerized sizing composition consists essentially of a thermoplastic or thermosetting resin and a flame retardant additive, said additive being present in an amount that is at least sufficient to render the composition non-burning or self-extinguishing.

40. A method of rendering a composition which comprises a normally flammable polyphenylene ether resin and filamentous glass non-burning or self-extinguishing, said method comprising coating said filamentous glass with a non-burning or self-entinguishing polymerized sizing composition that consists essentially of a thermoplastic or thermosetting resin, a chrome coupling agent and a flame retardant additive, said flame retardant additive being present in an amount that is sufficient to render the composition non-burning or self-extinguishing prior to blending the glass filaments into the polyphenylene ether resin.

41. In the method of rendering filamentous glass reinforced resin compositions non-burning and self-extinguishing the improvement which comprises providing the filamentous glass reinforcing agent with a non-burning or self-extinguishing polymerized sizing composition that consists essentially of a thermoplastic or thermosetting resin, a chrome coupling agent and a flame retardant additive, said flame retardant additive being present in an amount that is sufficient to render the composition non-burning or self-extinguishing.

42. A composition as defined in claim 37 wherein the flame retardant additive is a halogen-containing compound; a halogen-containing compound in admixture with antimony oxide; elemental phosphorus or a phosphorus compound; or a compound containing phosphorus-nitrogen bonds.

43. A composition as defined in claim 37 wherein the polymerized sizing composition consists of a thermoplastic or thermosetting resin selected from the group consisting of a styrene resin, an alkyl resin, an acrylate resin, a methacrylate resin, an aromatic polycarbonate resin, a polyacetal resin, a polyacetal resin, a polyamide resin, a vinyl ether resin, polyphenylene oxide resin or a mixture thereof and a flame retardant additive in an amount sufficient to render said resin non-burning or self-extinguishing.

44. A composition as defined in claim 43 wherein the polymerized sizing composition includes a thermosetting or cross-linked polyester or epoxy resin.

* * * * *